(12) United States Patent
Doan et al.

(10) Patent No.: US 11,182,719 B1
(45) Date of Patent: Nov. 23, 2021

(54) ASSOCIATING EXECUTABLE ACTIONS WITH WORK STEPS IN WORK PLANS GENERATED WHEN CREATING WORK ORDERS

(71) Applicant: salesforce.com, inc., San Francisco, CA (US)

(72) Inventors: Dai Duong Doan, Alameda, CA (US); Keye Liu, Hercules, CA (US); Rupa Singh, Fremont, CA (US); Shanis Kurundrayil, Fremont, CA (US); Tyler Shopshire, El Cerrito, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/899,778

(22) Filed: Jun. 12, 2020

Related U.S. Application Data

(63) Continuation-in-part of application No. 16/880,058, filed on May 21, 2020.

(51) Int. Cl.
| | |
|---|---|
| *G06Q 10/06* | (2012.01) |
| *G06Q 10/00* | (2012.01) |
| *G06Q 10/10* | (2012.01) |
| *G06F 9/451* | (2018.01) |
| *G06N 20/00* | (2019.01) |
| *G06F 16/22* | (2019.01) |
| *G06Q 30/00* | (2012.01) |

(52) U.S. Cl.
CPC ....... *G06Q 10/06316* (2013.01); *G06F 9/451* (2018.02); *G06F 16/22* (2019.01); *G06N 20/00* (2019.01); *G06Q 10/103* (2013.01); *G06Q 10/20* (2013.01); *G06Q 30/016* (2013.01)

(58) Field of Classification Search
CPC .......... G06Q 10/06316; G06Q 10/103; G06Q 10/20; G06Q 30/016; G06F 16/22; G06F 9/451; G06N 20/00
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton et al. |

(Continued)

*Primary Examiner* — Anil K Bhargava
(74) *Attorney, Agent, or Firm* — Dergosits & Noah LLP; Todd A. Noah

(57) ABSTRACT

A database system receives an input for creating a work order and identifies work plan criteria based on the input. The database system uses the work plan criteria to select work plan templates, which includes work steps, from multiple work plan templates. The database system creates a work order, including work plans corresponding to the work plan templates and at least part of the input for creating the work order. The database system displays the work order and receives a selection of an activity object displayed on one of the user interface pages displaying the work steps, and then displays an activity picklist. The database system receives a selection of an activity in the activity picklist, and adds, deletes, or modifies a database record by executing a user action or an automated business process corresponding to the activity in the activity picklist.

20 Claims, 10 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260594 A1* | 12/2004 | Maddox, Jr. ............ G06Q 10/20 705/305 |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobsen |
| 2009/0177744 A1 | 7/2009 | Marlow et al. |
| 2011/0288900 A1* | 11/2011 | McQueen ...... G06Q 10/063116 705/7.16 |
| 2012/0233137 A1 | 9/2012 | Jakobsen et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2014/0359537 A1 | 12/2014 | Jakobsen et al. |
| 2015/0007050 A1 | 1/2015 | Jakobsen et al. |
| 2015/0032491 A1* | 1/2015 | Ulm, Sr. .......... G06Q 10/06311 705/7.13 |
| 2015/0095162 A1 | 4/2015 | Jakobson et al. |
| 2015/0172563 A1 | 6/2015 | Jakobson et al. |
| 2017/0017903 A1* | 1/2017 | Gray ................ G06F 3/14 |
| 2017/0249574 A1* | 8/2017 | Knijnik ............ G06Q 10/06314 |
| 2018/0240058 A1* | 8/2018 | Vandersee ........ G06Q 10/06313 |
| 2019/0026663 A1* | 1/2019 | Homeyer ......... G06Q 10/06316 |
| 2021/0056509 A1* | 2/2021 | Lindy ................ G06F 9/451 |

* cited by examiner

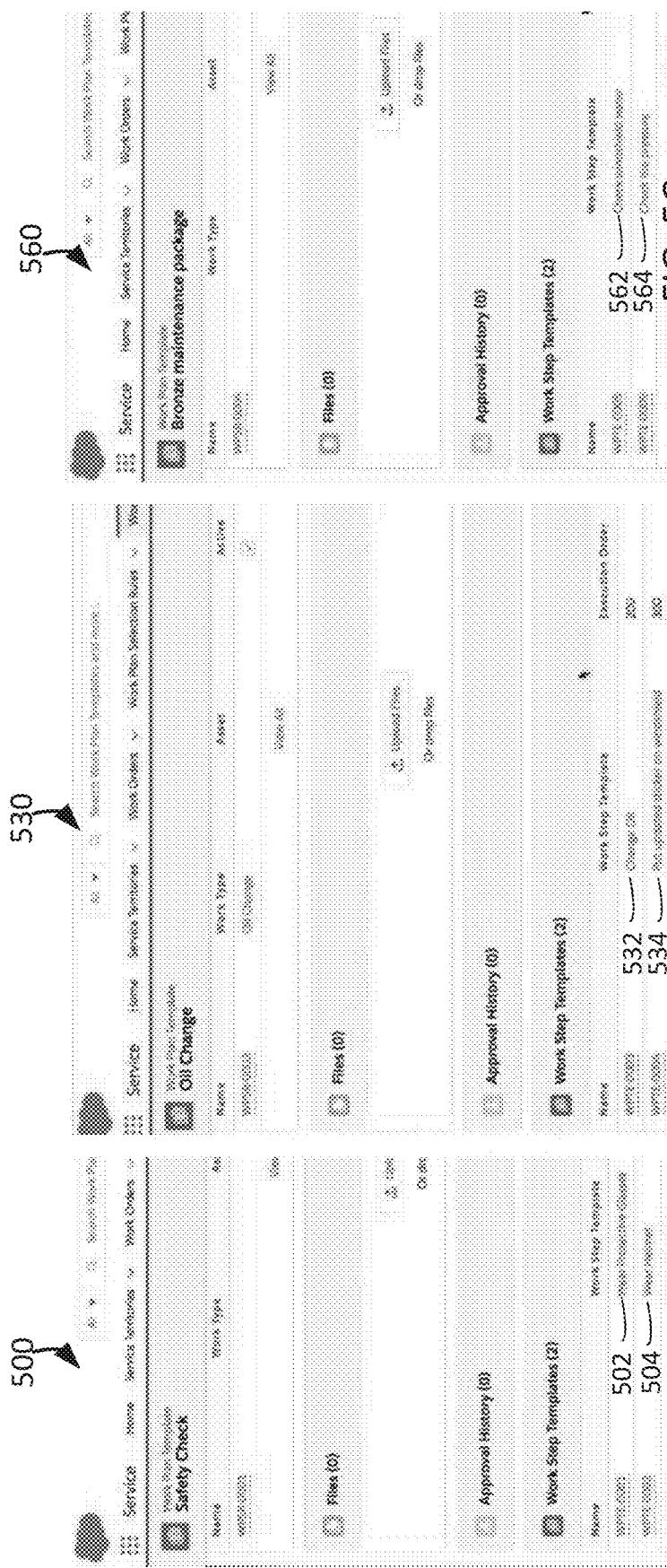

ASSOCIATING EXECUTABLE ACTIONS WITH WORK STEPS IN WORK PLANS GENERATED WHEN CREATING WORK ORDERS

CROSS REFERENCE TO RELATED APPLICATION

This patent application is a continuation-in-part of U.S. application Ser. No. 16/880,058, filed May 21, 2020, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A work order can be a physical or electronic document that specifies what physical and/or mental activity is to be completed to accomplish a goal, and which can provide additional details, such as any materials used to accomplish the goal and the materials' prices. Sometimes referred to as a service ticket, job order, or work ticket, a work order may be sent from an outside customer to an organization or used internally by an organization to request work from a specific department. A user such as a customer service representative can enter work order information into a computer that displays various work order templates to generate specific types of work orders. For example, maintenance work order templates include sections for a user to enter work details, labor and material costs, location, and a start date. A service work order template enables a user to input the service provided, any parts required, any additional charges, and the service date. In template for repairs to a building, a user can describe the repairs needed, assign due dates for completing the repairs, and document any expenses. A user can fill out information about a car at the top of an automotive work order template for maintenance or repair work, and then add details about labor and parts in the spaces below. A user can also record a requested Information Technology (IT) action, the date of the request, and details about the work in an IT services work order. Additionally, a user can keep track of work orders with a work order spreadsheet template which can organize work orders by their assigned tracking number, the allocated workers, the requestors, and/or other criteria.

BRIEF SUMMARY

A user who is providing information in a work order template typically has to supply the plans and the plans' steps required to complete a work order. Such a user typically bases such plans and steps on their own knowledge, the knowledge of system administrators and subject matter experts who the user consults, and/or knowledge articles that the user can reference. Consequently, such a user can easily make mistakes when creating work plans and work steps in a work order template, particularly when the user is a customer service representative for an organization that generates work orders for millions of assets at thousands of locations.

When creating a user interface page for a work order's work step, a system administrator can configure for multiple executable objects to be displayed on the work step's page, so that a technician can select to execute any of these objects to capture data while working in the field. Each executable object on a work step's page is for a different user action. For example, a technician selects a "log a call" button to change the displayed work step's page to a different page so that the technician can record a summary of a phone call about the work step. Then the technician clicks to return to the work step's page and selects a "complete" button to indicate that the work step is complete.

In accordance with embodiments, there are provided systems and methods for associating executable actions/flows with work steps in work plans generated when creating new work orders. A database system receives an input for creating a work order and identifies work plan criteria based on the input. The database system uses the work plan criteria to select work plan templates, which includes work steps, from multiple work plan templates. The database system creates a work order which includes work plans corresponding to the work plan templates and includes at least part of the input for creating the work order. The database system displays the work order. The database system receives a selection of an activity object displayed on one of the user interface pages displaying the work steps, and then displays an activity picklist on the user interface page. The database system receives a selection of an activity in the activity picklist, and then adds, deletes, or modifies a database record by executing a user action or an automated business process corresponding to the activity in the activity picklist.

For example, a work order generating system receives the inputs "oil change," a car's license plate characters "XYZ123," and "Joe Smith," the name of the customer service representative who is creating a work order for the car. The work order generating system uses the "oil change" input to identify an oil change work type and uses the car's license plate characters "XYZ123" to identify the car owner Brian's bronze service contract, and the car as a Mercedes Benz. The work order generating system selects a safety check work plan template for all work orders, an oil change work plan template for the oil change work type, a bronze maintenance package work plan template for the car owner Brian's bronze service contract, and a synthetic oil work plan template, because previous technicians' completion notes specified that Mercedes Benz cars require synthetic oil.

The safety check work plan template includes the work steps of wearing protective glasses and wearing a helmet, the select synthetic oil work plan template includes the work steps of identifying synthetic oil selection criteria for a car and using the synthetic oil selection criteria to select the appropriate synthetic oil, the oil change work plan template includes the work steps of changing the oil and putting an updated sticker on the car's windshield, and the bronze maintenance package work plan template includes the work steps of checking the windshield water and checking the tire pressure. The system uses the safety check, select synthetic oil, oil change, and bronze maintenance package work plan templates to create a work order. The work order includes the work steps of wearing protective glasses, wearing a helmet, identifying synthetic oil selection criteria for Brian's car, using the synthetic oil selection criteria to select the appropriate synthetic oil, changing the oil, putting an updated sticker on the car's windshield, checking the windshield water, and checking the tire pressure. The work order also includes the inputs "oil change," "XYZ123," the car's license plate characters, and "Joe Smith," the name of the customer service representative. The system outputs the work order that includes the four work plans' eight work steps to the customer service representative Joe Smith, who only had to enter "oil change" and the car's license plate characters to automatically generate this correct and comprehensive work order.

While confirming that Brian's tire pressure is in the manufacturer's suggested pressure range, Joe notices that the tire tread is low on all four tires and recommends that Brian replace the tires soon, to which Brian agrees. When Joe selects the "complete" button displayed on the "check tire pressure" work step's page, the work order generating system displays a picklist on the check tire pressure work step page. When Joe selects a salesforce.com lightning flow for ordering new tires from the picklist, the work order generating system launches the lightning flow from the check tire pressure work step page, which creates a database record for the prospective order of new tires, automatically marks the check tire pressure work step as completed, and then links the prospective order of the new tires to the completed check tire pressure work step. Joe did not have enter several clicks to navigate from the launched lightning flow's page back to the check tire pressure work step page to mark the check tire pressure work step as completed.

When viewing the launched lightning flow's first page, Joe enters the make, model, and year of Brian's Mercedes Benz. The launched lightning flow's second page displays the tire options available for Brian's car, which range from $80 to $800 per tire, but Brian does not select an option because his wife is responsible for the family budget. The work order generating system receives Joe's selections of other activities from the picklist, which repurpose the initial selection of the "complete" button to initially pause the launched lightning flow and then email a link to the paused lightning flow's page to Brian. Brian forwards Joe's email to his wife Hope, who selects one of the paused lightning flow page's options to purchase new tires, which resumes the lightning flow, and thereby orders the new tires.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 5A, FIG. 5B, and FIG. 5C depict example frames 500, 530, and 560 of work plan templates for associating executable actions/flows with work steps in work plans generated when creating new work orders, in an embodiment;

DETAILED DESCRIPTION

General Overview

Systems and methods are provided for associating executable actions/flows with work steps in work plans generated when creating new work orders. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, a method, frames, a data model and systems for associating executable actions/flows with work steps in work plans generated when creating new work orders will be described with reference to example embodiments. The following detailed description will first describe an example method, frames, and work plan data model for associating executable actions/flows with work steps in work plans generated when creating new work orders. Then systems for associating executable actions/flows with work steps in work plans generated when creating new work orders are described.

While one or more implementations and techniques are described with reference to an embodiment in which associating executable actions/flows with work steps in work plans generated when creating new work orders is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Figure 1A:
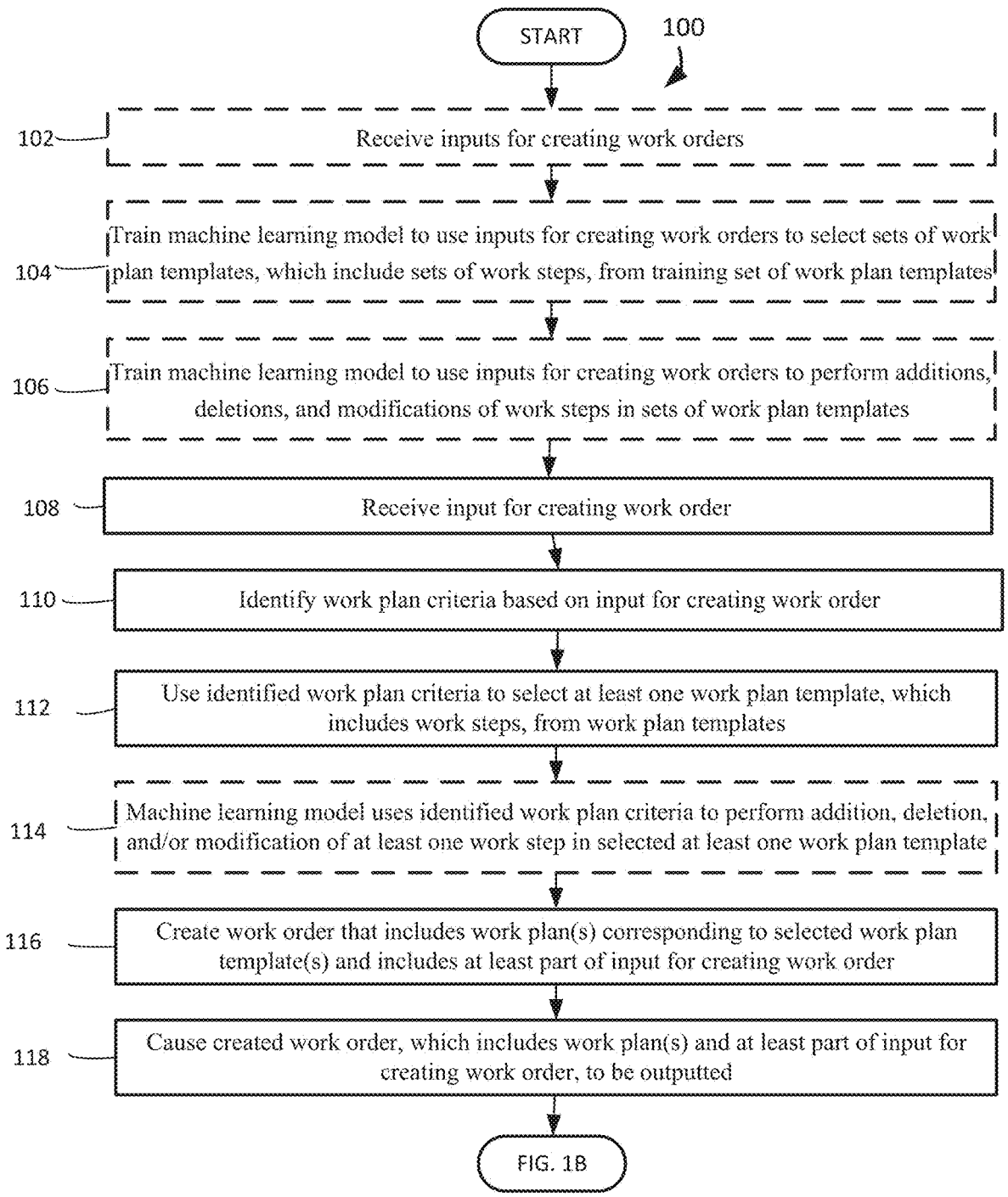
FIG. 1A and FIG. 1B are an operational flow diagram illustrating a high-level overview of a method 100 for associating executable actions/flows with work steps in work plans generated when creating new work orders, in an embodiment.
Figure 1B:
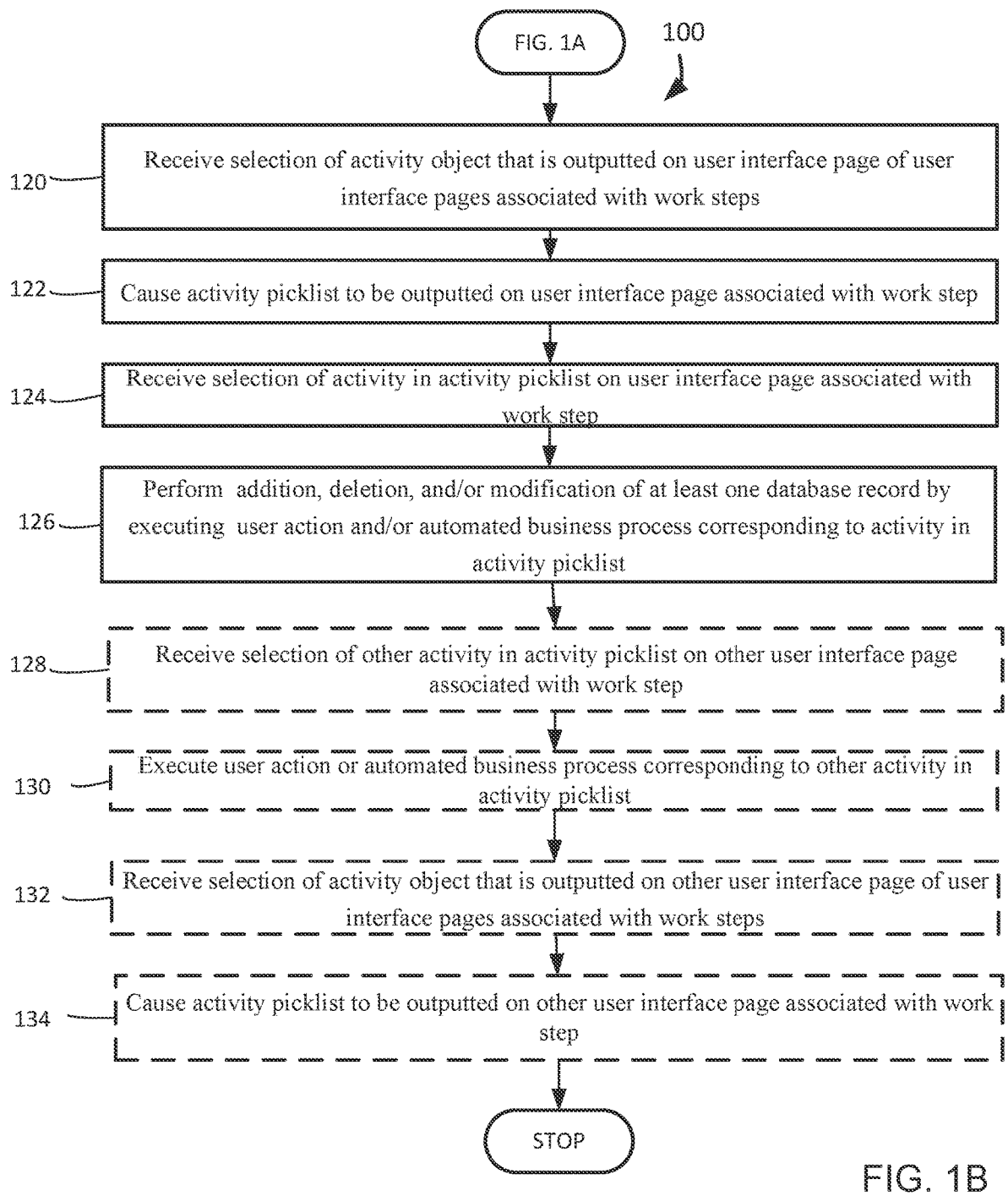

FIG. 1A and FIG. 1B are an operational flow diagram illustrating a high-level overview of a method 100 for associating executable actions/flows with work steps in work plans generated when creating new work orders. A machine-learning model optionally begins training by receiving inputs for creating work orders, block 102. The machine-learning model can begin training by receiving previous user's inputs in work order templates which created previous work orders. For example, and without limitation, this can include a database system, such as a work order generating system, receiving previous inputs from customer service representatives who created previous work orders, which include automotive maintenance inputs that created automotive maintenance work orders. A database system can be computer software and/or hardware that interacts with a user and software applications to capture and analyze the quantities, characters, and/or symbols on which operations are performed by a computer, being stored and transmitted in the form of electrical signals and being recorded on magnetic, optical, and/or mechanical recording media. An input can be information that enters a system.

After receiving previous inputs which created previous work orders, a machine learning model is optionally trained to use the inputs to select sets of work plan templates, which include sets of work steps, from a training set of work plan templates, block 104. The system can train a machine-learning model to use work order inputs to select work plan templates. By way of example and without limitation, this can include the work order generating system training a work order machine-learning model to use previous customer service representatives' inputs in automotive maintenance work order templates to select specific automotive maintenance work plan templates, which include automotive maintenance work steps, from a training set of automotive maintenance work plan templates. Continuing this example, the work order machine-learning model learns to select automotive maintenance work plan templates by being trained on automotive maintenance work orders that include technicians' completion notes specifying that Mercedes Benz cars require synthetic oil.

A machine-learning model can be a computer system that scientifically studies algorithms and/or statistical models to perform a specific task effectively by relying on patterns and inference instead of using explicit instructions. A set can be a group of entities that resemble each other. A work plan template can be a preset format of a document or file for an outline of a set of goals and processes by which a team or a person can accomplish those goals, which is used so that the format does not have to be recreated each time that such a document or file is used. A work step can be an outline of a task for a team or a person to accomplish a goal. A training set can be a group of entities that resemble each other and is used to teach a particular type of behavior through practice and instruction over a period of time.

In addition to being trained to select work plan templates, the machine learning model may be optionally trained to use the inputs to perform additions, deletions, and modifications of work steps in sets of work steps in sets of work plan templates, block 106. The system can train a machine-learning model to use work order inputs to change the work steps in work plan templates. In embodiments, this can include the work order generating system training the work order machine-learning model to use the previous customer service representatives' inputs in automotive maintenance work order templates to make changes in the automotive maintenance work steps in automotive maintenance work plan templates. Further to this this example, the work order machine-learning model learns to add, delete, and modify automotive maintenance work step templates by being trained on automotive maintenance work orders that include technicians' completion notes specifying that Mercedes Benz cars require synthetic oil.

An addition can be the action of inserting an entity into a group of entities. A deletion can be the action of removing an entity from a group of entities. A modification can be the action of altering an entity to improve the entity.

Figure 2:
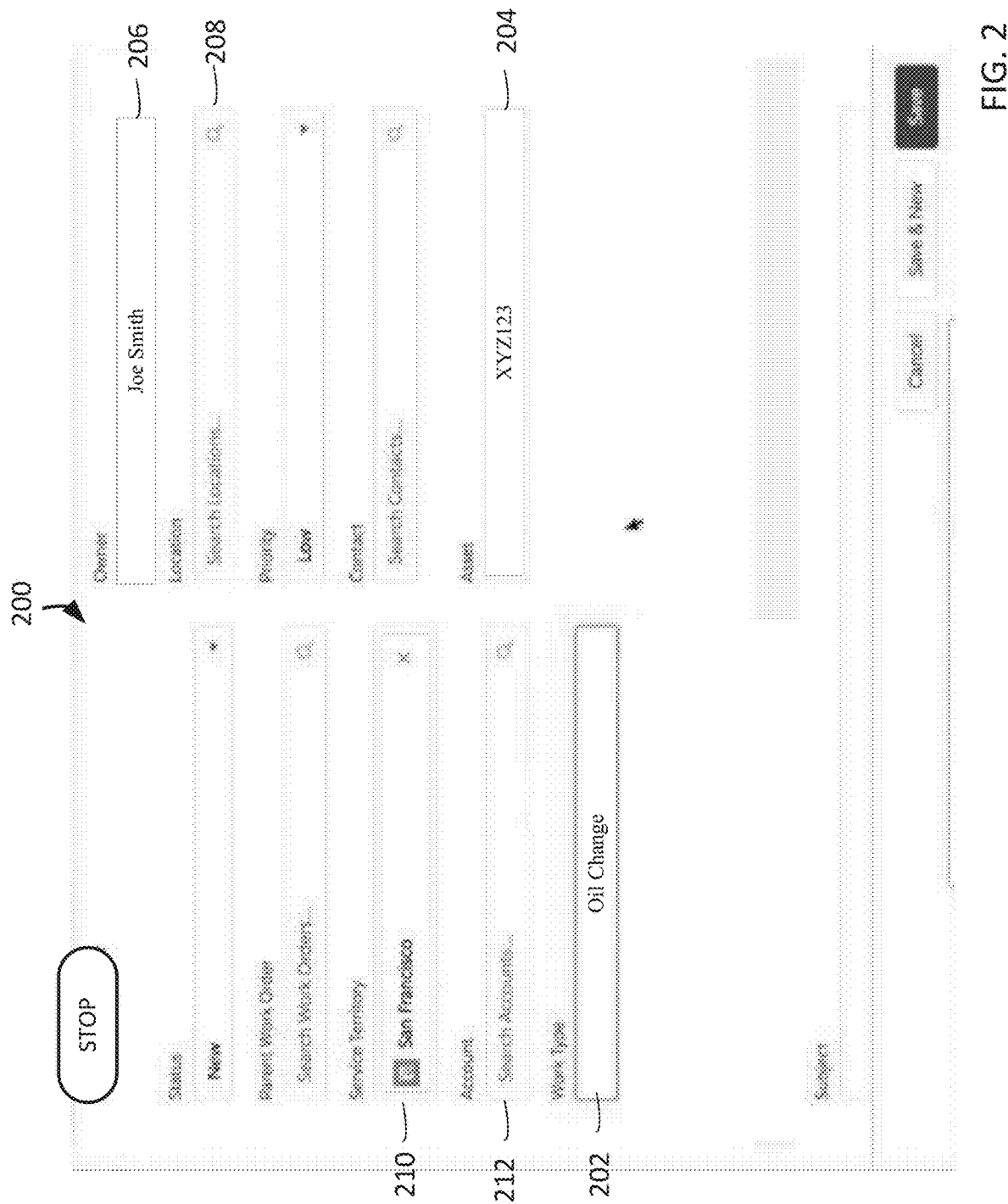
FIG. 2 depicts an example frame 200 of a work order template for associating executable actions/flows with work steps in work plans generated when creating new work orders, in an embodiment.

Following any optional training of a machine-learning model, input is received for creating a work order, block 108. The system receives a user's input in a work order template for creating a work order. For example, and without limitation, this can include a work order generating system receiving the inputs "oil change" in the work type field 202, a car's license plate characters "XYZ123" in the asset field 204, and "Joe Smith," the name of the customer service representative who is creating a work order for Brian's car, in the owner field 206, as depicted in the work order template frame 200 by FIG. 2. This example describes how some inputs may be entered via a pick list, such as the "oil change" work type, and other inputs may be entered via a free form field, such as the car's license plate characters "XYZ123." A work type can be a category of a physical and/or mental activity in order to achieve a purpose or result, especially related to a job. An asset can be property owned by a company or an individual and regarded as having value Although this example describes the input for creating the work order as being received from a system user, the input for creating the work order may be received from a software application that generates the input based on a maintenance plan. For example, every six months a maintenance plan application inputs "tire rotation" in the work type field 202 and the car's license plate characters "XYZ123" in the asset field 204 to generate a work order for rotating the car's tires. A system user can be a person who operates a computer. A software application can be a computer program designed to perform a group of coordinated functions, tasks, and/or activities. A maintenance plan can be a physical or electronic document that defines work done to keep an asset in working condition by checking and/or repairing the asset regularly.

The frame 200 also includes a location field 208, a service territory field 210, and an (customer) account field 212, in which a system user can enter inputs for creating a work order. Although not depicted by FIG. 2, the frame 200 can also include fields for the user to input information for a product, a service contract, and any other information that may be input for creating a work order. A location can be a particular place or position. A service territory can be a geographical area where an individual or a team works. A customer account can be a business relationship with the buyer of a product and/or a service. A product can be an article that is manufactured for sale. A service contract can be a business agreement with a customer covering the maintenance of equipment over a specified time period.

Figure 3:
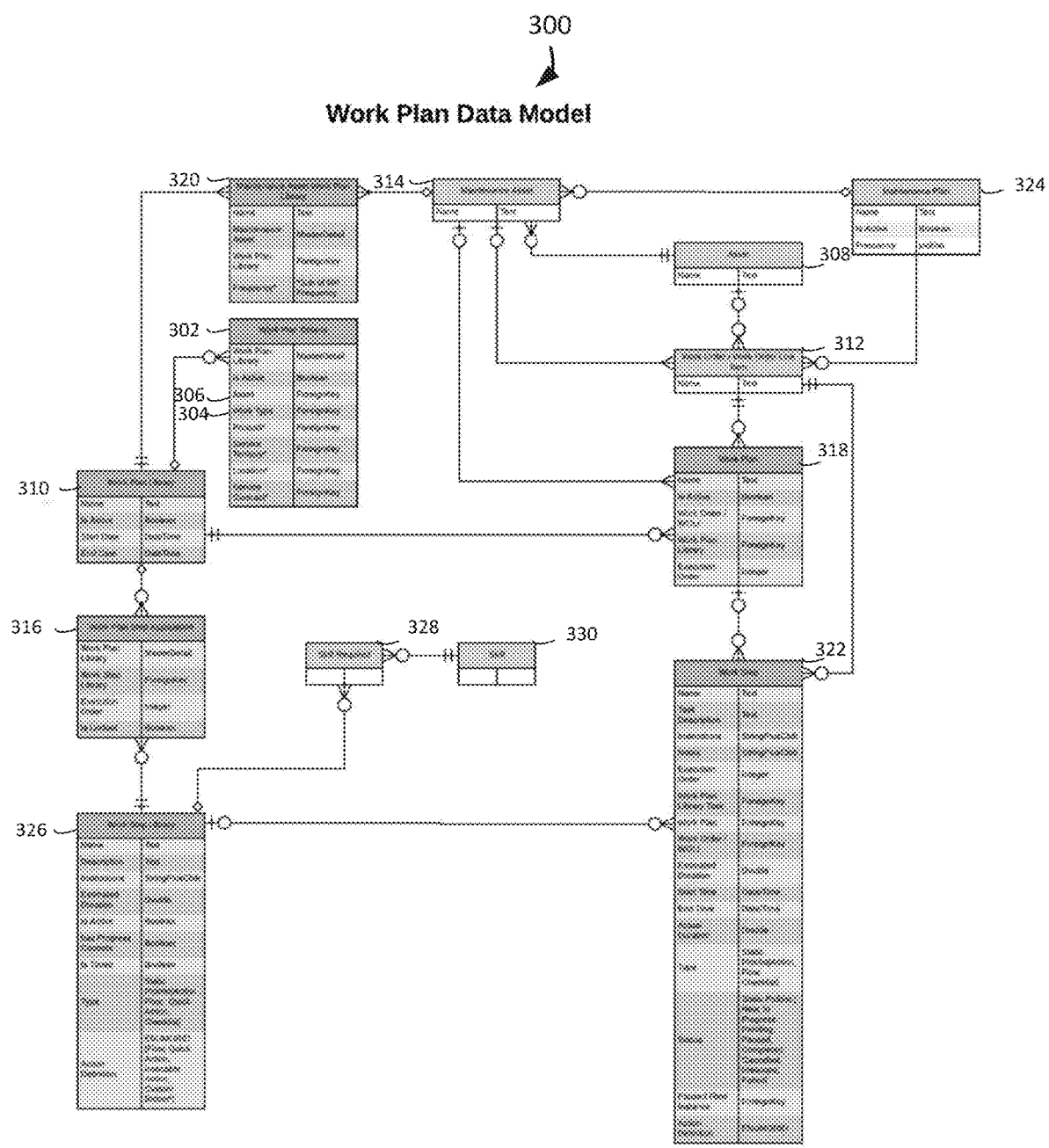
FIG. 3 depicts an example representation of a work plan data model 300 for associating executable actions/flows with work steps in work plans generated when creating new work orders, in an embodiment.

Having received an input for creating a work order, work plan criteria are identified based on the input for creating the work order, block 110. The system determines which inputs are used to select any work plan templates and/or identify any work steps to be changed. By way of example and without limitation, this can include the work order generating system referencing a table of work plan criteria 302 to determine that the "oil change" input directly identifies a work type 304 of an oil change in the work plan criteria table 302, and that the car's license plate characters "XYZ123" directly identifies an asset 306 of a car in the work plan criteria table 302, as depicted in the data model 300 by FIG. 3. Since the asset 306 in the work plan criteria table 302 includes a foreign key for a table of assets 308, the system uses this identified car asset 306 to indirectly identify the car owner Brian's service contract as a bronze service contract in the asset table 308, as depicted in the data model 300 by FIG. 3. In a contrasting example, the system did not directly or indirectly identify any work plan criteria from the input of "Joe Smith," the name of the customer service representative. Work plan criteria can be standards for deciding which information corresponds to an outline of a set of goals and processes by which a team or a person can accomplish those goals.

The system enables customers to customize features and add custom features to extend the "out of the box" capabilities of the data model 300, which are described as follows. The work plan criteria table 302 includes foreign keys for work plan criteria, such as asset 306, work type 304, product, service territory, location, and service contract, and a relationship to a library of work plans 310. The asset table 308 includes relationships to a table of work orders/work order line items 312 and a table of maintenance assets 314. The work plan library 310 includes work plan templates and relationships to the work plan criteria table 302, a table of work plan—work step associations 316, a table of work plans 318, and a library of maintenance assets—work plans 320. The work order/work order line item table 312 includes relationships to the asset table 308, the maintenance asset table 314, the work plan table 318, a table of work steps 322, and a table of maintenance plans 324.

The maintenance asset table 314 includes relationships to the asset table 308, the maintenance asset—work plan library 320, and the maintenance plan table 324. The work plan—work step association table 316 associates the work plan library 310 with a library of work steps 326. The work plan table 318 includes relationships to the work plan library 310, the work order/work order line item table 312, the maintenance asset table 314, and the work step table 322. The maintenance asset—work plan library 320 includes relationships to the work plan library 310 and the maintenance asset table 314. The work step table 322 includes relationships to the work order/work order line item table 312, the work plan table 318; and the work step library 326.

The maintenance plan table 324 includes relationships to the work order/work order line item table 312 and the maintenance asset table 314. The work step library 326 includes work step templates and relationships to the work plan—work step association table 316, the work step table 322, and a table of skills required 328. The skills required table 328 includes relationships to the work step library 326 and a table of skills 330. The skills table 330 includes a relationship to the skills required table 328.

The work order generating system enables end users to collect expert knowledge via the work plan templates in the work plan library 310 and the work step templates in the work step library 326. The knowledge collected in these templates can reduce the possibilities of technicians omitting a required work step, and can shift from any individual technician's knowledge to collective system knowledge. The knowledge collected in the work plan templates and the work step templates can also incorporate an enterprise's culture. For example, Acme Corporation requests customers to complete a customer satisfaction survey as the last work step of any field service work order. After training on the customer responses to the customer satisfaction survey, the work order machine-learning model can add, delete, or modify work steps in subsequent work orders, such as adding a final "clean-up" step to field service work orders due to receiving a number of low customer satisfaction scores from surveys that reported technicians' failures to clean up their work areas after completing a work order.

After the work plan criteria is identified, the identified work plan criteria is used to select at least one work plan template, which includes work steps, from the work plan templates, block 112. The system uses work plan criteria to select work plan templates. In embodiments, this can include the work order machine-learning model using the work plan criteria identified in the work plan criteria table 302 to select a safety check work plan template from the work plan library 310 for all work orders, an oil change work plan template from the work plan library 310 for the oil change work type 304, and a bronze maintenance package work plan template from the work plan library 310 for the car owner Brian's bronze service contract in the asset table 308. For this example, the work order machine-learning model did not select a platinum maintenance package because the work plan criteria related to the asset table 308 specified a bronze maintenance package, and did not select a San Francisco customer service survey because the work plan criteria identified in the work plan criteria table 302 did not specify San Francisco as the location.

Due to being trained on automotive maintenance work orders that include technicians' completion notes specifying that Mercedes Benz cars require synthetic oil, the work order machine-learning model can use the car's license plate characters "XYZ123," which identify the car as a Mercedes Benz, to select an existing work plan template for selecting the appropriate synthetic oil for Brian's car. The select synthetic oil work plan template includes the work steps of identifying synthetic oil selection criteria for a car and using the synthetic oil selection criteria to select the appropriate synthetic oil. Alternatively, the work order machine-learning model can create a new work plan template for selecting the appropriate synthetic oil for a car, and then select the newly created work plan template for creating the current work order. A trained machine-learning model can be a computer system that has scientifically studied algorithms and/or statistical models to perform a specific task effectively by relying on patterns and inference instead of using explicit instructions.

Figure 4A:
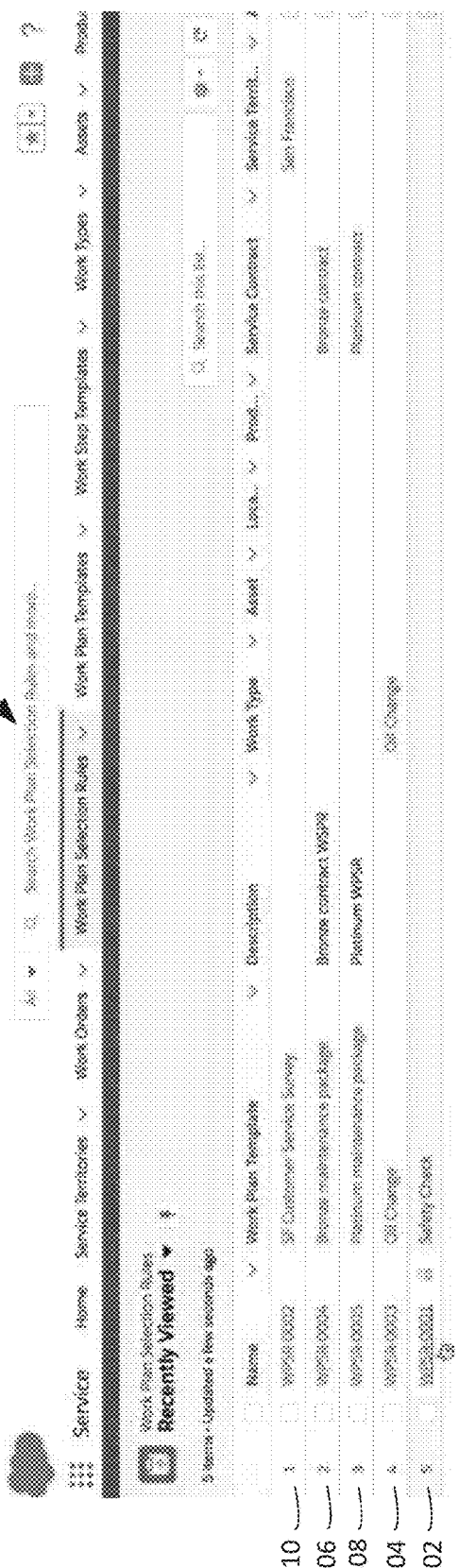
FIG. 4A and FIG. 4B depict example frames 400 and 430 of lists of work plan templates and work plan selection rules for associating executable actions/flows with work steps in work plans generated when creating new work orders, in an embodiment.
Figure 4B:
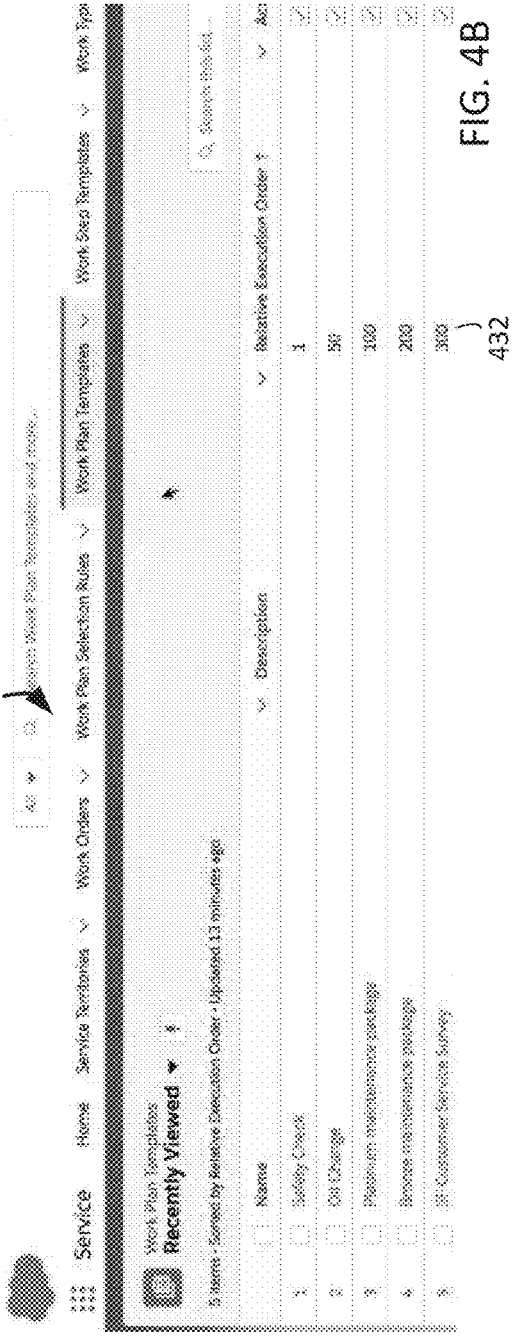

In some embodiments, the work order machine-learning model is trained to make selections of work plan templates, and then creates work plan selection rules that reflect this training. In such embodiments, the work order machine-learning model applies the work plan selection rules that it created to the work plan criteria identified in the work plan criteria table 302, including a rule 402 that selects a safety check work plan template from the work plan library 310 for all work orders, as depicted in the frame 400 by FIG. 4. In other embodiments, a system administrator can create work plan selection rules which the work order generating system applies to the work order criteria identified in the work plan criteria table 302, including the rule 402 that selects a safety check work plan template from the work plan library 310 for all work orders, as depicted in the frame 400 by FIG. 4. The work plan selection rules applied to the work plan criteria identified in the work plan criteria table 302 also includes a rule 404 that selects an oil change work plan template from the work plan library 310 for the oil change work type 304, as depicted in the frame 400 by FIG. 4. The work plan selection rules applied to the work plan criteria identified in the work plan criteria table 302 further includes a rule 406 that selects a bronze maintenance package work plan template from the work plan library 310 for the car owner Brian's bronze service contract in the asset table 308, as depicted in the frame 400 by FIG. 4. For this example, the work order generating system did not apply the rule 408 that selects a platinum maintenance package because the work plan criteria related to the asset table 308 specified a bronze maintenance package, and did not apply the rule 410 that selects a San Francisco customer service survey because the work plan criteria identified in the work plan criteria table 302 did not specify San Francisco as the location.

While the work plan selection rule 404 could be the equivalent of "if work type equals oil change, then select oil change work plan template," the work plan selection rules may be more complex and use logical ANDs and/or logical ORs. For example, an additional work plan selection rule that could be executed after rule 406 could be the equivalent of "if service contract equals bronze AND service contract expires in less than 30 days, then temporary upgrade the customer by selecting a platinum maintenance package work plan template," which offers a incentive for the car owner Brian to consider upgrading his service contract upon renewal.

The frame 430 depicts the six work plan templates that correspond to the rules 402-410 in the frame 400, with the six work plan templates listed according to their relative execution order 432. Although the frame 400 depicts five automotive maintenance work plan selection rules for six automotive maintenance work plan templates and the frame 430 depicts six automotive maintenance work plan templates, the work order machine-learning model or a system administrator can create and use any numbers of any types of work plan selection rules to select from any numbers of any types of work plan template. For example, a system administrator can create monthly, quarterly, and annual work plan selection rules to select work plan templates for high performance process manager maintenance, general data and safety, software and backup, controller inspection, and final inspection.

FIG. 5A depicts that the safety check work plan template 500 from the work plan library 310 may include work step templates from the work step library 326 for wearing protective glasses 502 and wearing a helmet 504. FIG. 5B depicts that the oil change work plan template 530 from the work plan library 310 may include work step templates from the work step library 326 for changing the oil 532 and putting an updated sticker on the car's windshield 534. FIG. 5C depicts that the bronze maintenance package work plan template 560 from the work plan library 310 may include work step templates from the work step library 326 for checking the windshield water 562 and checking the tire pressure 564. The work plan—work step association table 316 that associates the work plan library 310 with the work step library 326. enables these work plan templates to include these work step templates. The system can use the relationships from the work step library 326 to the skills required table 328 and from the skills required table 328 to the skills table 330 to identify the technicians with the skills required to perform the related work steps. A work step template can be a preset format of a document or file for an outline of a task for a team or a person to accomplish a goal, which is used so that the format does not have to be recreated each time that such a document or file is used.

Figure 7A:
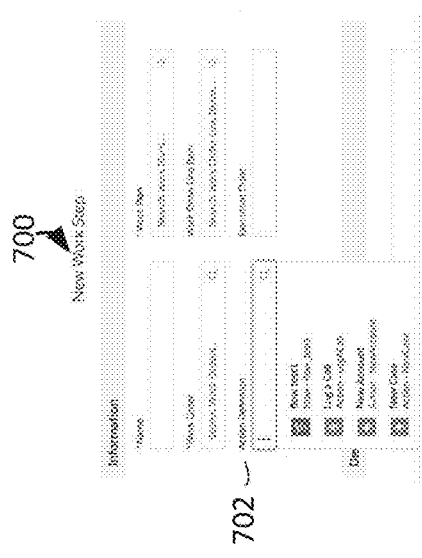
FIG. 7A, FIG. 7B, and FIG. 7C depict an example frame 700 for work order steps, a subsection of an example data model 730, and an example frame 760 for work order steps for associating executable actions/flows with work steps in work plans generated when creating new work orders, in an embodiment.
Figure 7B:
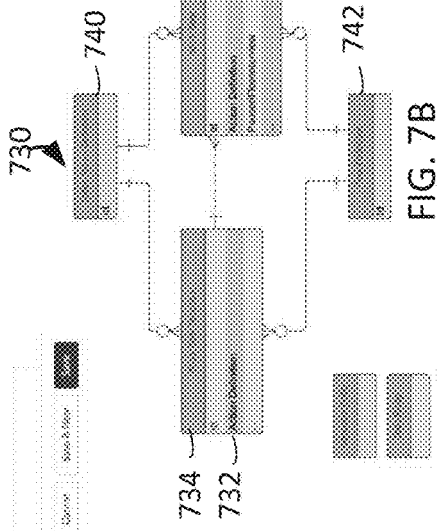
Figure 7C:
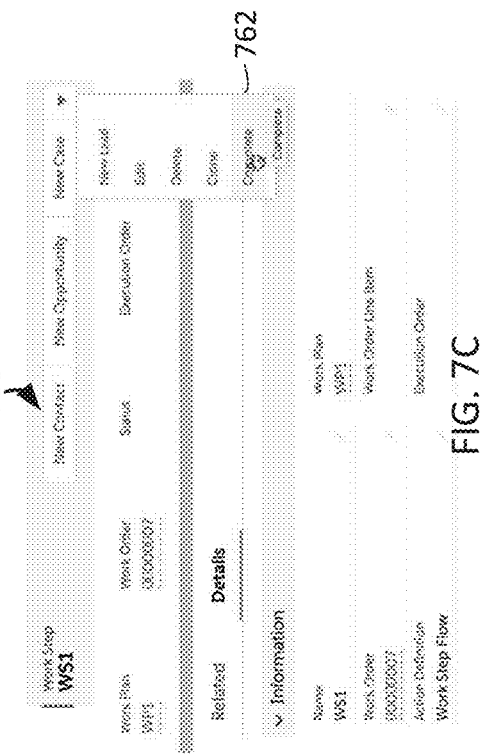

Although these example work plan templates 500, 530, and 560 include work step templates 502, 504, 532, 534, 562, and 564, respectively, the reusable work plan templates do not require reusable work step templates because every work step may be recreated each time that such a work step is required for the reusable work plan templates. Due to the modularity and efficiency of reusable templates, the system may reference reusable work step templates, instead of newly recreating work steps, in the reusable work plan templates, and can reference the same reusable work step template in many different reusable work plan templates. For example, the work step depicted in FIG. 7A as the configurable work step 700, depicted by FIG. 7C as the executable work step 760, and described below in reference to FIG. 7A and FIG. 7C displays five standard data fields and four standard selectable actions. If a customer wants to add a work step with two custom actions to twelve different work plans, a system administrator would enter the name of the work step in one of the standard fields of a work step template, enter the two custom actions in the work step template, and then enter a dozen references to the work step template into the dozen work plan templates, which auto-fills the data in the remaining four standard data fields. By using a work step template, the system administrator needed to make a total of only fifteen entries, which are the entries for one standard field plus two custom actions plus twelve references.

If the system used work steps instead of work step templates, the same system administrator would have to enter the data in the five standard fields and the two custom actions in each of the twelve work plan templates, such that the system administrator would make a total of eighty-four entries, which are the entries for five standard fields plus two custom actions equals seven entries that are multiplied by twelve work plan templates. While this example illustrates an increase of sixty-nine entries required when configuring work steps instead of work step templates, in real-world scenarios, the differences between configuring work steps and work step templates could be significantly greater. Similar to the preceding example that describes the reuse of work step templates, the work order generating system can reuse work plan templates, such as selecting the same safety check work plan template from the work plan library 310 for all work orders, as described above.

Although the frames 500 530, and 560 depicts six automotive maintenance work steps for three automotive maintenance work plan templates, the system can provide any numbers of any types of work steps for any numbers of any types of work plan templates, such as the work steps for high performance process manager maintenance. Such work steps could include (in execution order) checking and cleaning fans and filters, checking card status indicators, checking communication and control CPU free to ensure they meet minimum requirements for the node, checking for excessive processing overruns and recommending actions to correct the problem, checking power supply statuses, checking the alarm system (power supply, battery) if not disabled, checking the I/O link bandwidth free and ensure they meet minimum requirements, checking the I/O link communication statistics, resetting the I/O link communication statistics, and resetting UCN communication statistics.

Following the use of the identified work criteria to select at least one work plan template, the machine learning model optionally uses the identified work plan criteria to perform an addition, a deletion, and/or a modification of at least one work step in the selected at least one work plan template, block 114. The system can use the work plan criteria to also make changes in the work plans' work steps. For example, and without limitation, this can include the work order machine-learning model using the car's license plate characters "XYZ123," which identify Brian's car as a Mercedes Benz, to modify the existing work step "changing the oil" to become the new work step "selecting synthetic oil for a Mercedes Benz and changing the oil" in the oil change work plan template for Brian's Mercedes Benz. The work order machine-learning model modified the work step to incorporate synthetic oil due to being trained on automotive maintenance work orders that included technicians' completion notes specifying that Mercedes Benz cars require synthetic oil. In this example, the modification of this work step in the oil change work plan template for Brian's Mercedes Benz does not affect the oil change work plan template for any other work orders.

Figure 6:
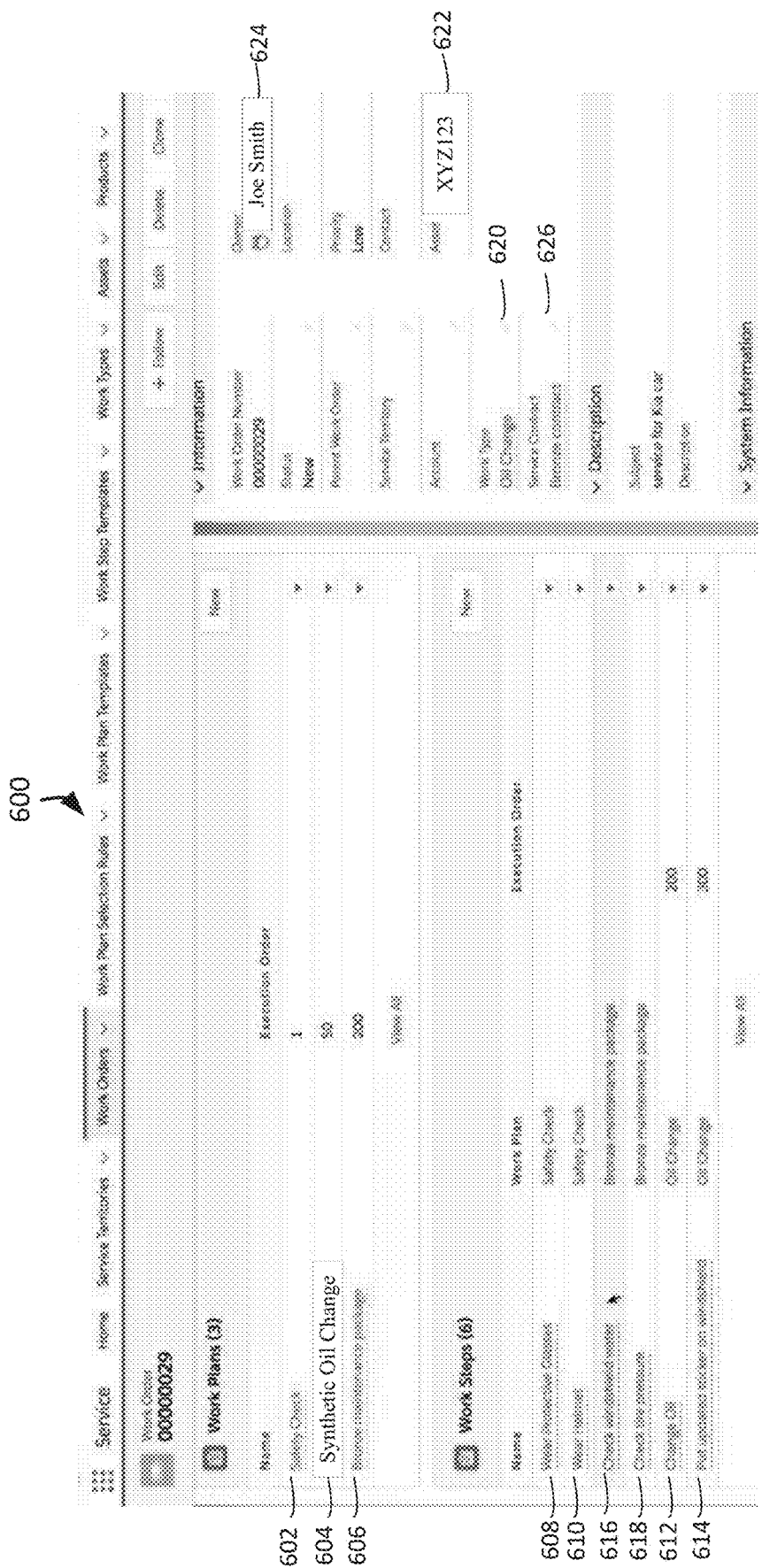
FIG. 6 depicts an example frame 600 of a work order for associating executable actions/flows with work steps in work plans generated when creating new work orders, in an embodiment.

Having selected work plan template(s), a work order is created that includes work plan(s) corresponding to selected work plan template(s) and also includes at least a part of the input for creating the work order, block 116. The system generates work plans which include work steps when creating new work orders. By way of example and without limitation, this can include the work order generating system copying the safety check 602, synthetic oil change 604, and bronze maintenance package 606 work plan templates in the work plan library 310 into the work plan table 318 to create a work order in the work order/work order line items table 312, as depicted in the frame 600 by FIG. 6. The work order in the work order/work order line items table 312 is related to the work steps of wearing protective glasses 608, wearing a helmet 610, changing the oil 612, putting an updated sticker on the car's windshield 614, checking the windshield water 616, and checking the tire pressure 618 in the work step table 322, as also depicted in the frame 600 by FIG. 6. The work order in the work order/work order line items table 312 also includes the inputs "oil change" 620, the car's license plate characters "XYZ123" 622, the name of the customer service representative "Joe Smith" 624, and the derived information "bronze contract" 626, as further depicted in the frame 600 by FIG. 6. A work plan can be an outline of a set of goals and processes by which a team or a person can accomplish those goals. A part can be a portion of an entity.

After creating the work order, the created work order is caused to be output, including the work plan(s) and at least a part of the input for creating the work order, block 118. The system outputs the new work order that was created when generating work plans which include work steps. In embodiments, this can include the work order generating system outputting the work order from the work order/work order line items table 312, which includes the three work plans' six work steps 608-618 in their relative execution order, from the work steps table 322, as depicted in the frame 600 by FIG. 6, to the mobile device of the customer service representative, Joe Smith. The customer service representative only had to enter "oil change" and the car's license plate characters to automatically generate this correct and comprehensive work order.

The work order generating system has the flexibility to adapt to ad hoc requirements of users, such as by enabling a user to add a work plan, delete a work plan, or regenerate all work plans to include recent modifications to work steps, or to add a work step, delete a work step, or modify a work step. For example, if Joe reviews records which indicate that he recently replaced the brakes on Brian's Mercedes Benz, and Joe also notices that the car's headlights need to be replaced, Joe can delete the brake check work plan from the initially created work order and add a headlight replacement work plan that was not part of the initially created work order. Although this example describes a work order for a single asset, the work order may include work order line items that each correspond to a different asset. For example, an application may use a large organization's maintenance plan, from the maintenance plan table 324, to access the work plan library 310 via the maintenance asset—work plan library 320 and generate a single work order in the work order/work order line items table 312, which schedules a large number of cars, which are identified in the maintenance asset table 314, for an oil change within the same time period, A software vendor's system administrator and/or a customer's end user (such as a system administrator or a technician) can configure which actions and which flows may be executed from a user interface page for a work step. For example, the frame 700 depicts a customer's system administrator configuring a new work step template to enable a technician working in the field to execute various actions 702 specified in the work step library 326, such as launching a flow test, logging a call, creating a new account, and creating a new case. A software vendor can be a provider of programs and other operating information used by a computer. An end user can be a person that utilizes an item that was sold or leased. Dynamically can be relating to configurations that update frequently.

Frame 730 depicts a subsection of an example data model for associating executable actions/flows with work steps in work plans generated when creating new work orders. An action, which may be referred to as an activity, may be defined as either a quick action definition, a global action definition, or a flow definition, and may be stored in in an action definition field 732 in a work step template 734 and/or an action definition field 736 in a work step object 738. Each action definition may be vendor-defined, which is an "out of the box" action definition, or customer defined, which is a customized action definition. Both the quick action definition object 740 and the flow definition object 742 store metadata definition. The work step template 734 and/or the work step object 738 has a one-to-many relationship with the quick action definition object 740 and/or the flow definition object 742.

An action definition object 740 and/or 742 stores a reference for launching an activity. The work order generating system uses a standard action to launch a quick action, launch a global action, resume or pause a flow, or directly update a record field or a status. Since one standard action can dynamically launch these four activity types, an end user can select a single activity object to perform multiple different types of activities. Every system administrator and every end user, such as a technician in the field, can perform one or multiple activities by changing the actions after performing one action after another action. Once an activity is completed, the action definition object 740 and/or 742 may be repurposed for a different activity launch. A paused/flow/interview object stores a flow reference, which has been paused, for later invocation.

Frame 760 depicts the user interface for a technician in the field, in which the technician is selecting from a pick list 762 from the work step table 322, to update a record field by indicating that the status of the displayed work step is complete. Subsequently, the system can analyze the completed work orders, and then generate dashboards and service reports that monitor and improve key performance indicators.

A work step may be associated with an execution order, an execution status, a start time, a stop time, and/or a duration. For example, the start time of the first work step for high performance process manager maintenance is scheduled for 3:00 A.M. Sunday, the stop time for the last work step for high performance process manager maintenance is scheduled for 4:00 A.M. Sunday, the maintenance duration is scheduled for an hour, and at 3:10 A.M. the status of the first work step is completed, the status of the second work step is executing, and the statuses of the remaining work steps are pending. An execution order can be the sequence for carrying out or putting into effect a plan or course of actions. An execution status can be the position of affairs at a particular time, especially in commercial contexts, for carrying out or putting into effect a plan or course of actions. A start time can be a chronological beginning of an activity. A stop time can be a chronological ending of an activity. A duration can be the time during which an activity continues.

Following the output of a work order that includes work plans that have work steps, a selection is received of an activity object that is outputted on a user interface page of user interface pages associated with the work steps, block 120. The system outputs work step pages that include selectable objects. For example, and without limitation, this can include the work order generating system receiving Joe's selection of a "complete" button displayed on the work step page for work step 8, which corresponds to checking the tire pressure 618 in the work step table 322, as depicted in the frame 600 by FIG. 6. While confirming that Brian's tire pressure is in the manufacturer's suggested pressure range, Joe notices that the tire tread is low on all four tires and recommends that Brian replace the tires soon, to which Brian agrees. A selection can be the action of carefully choosing something as being the most suitable. An activity object can be a selectable data construct that provides a description of something that may be used by a computer to achieve a goal. A user interface page can be a section of information displayed on a screen that a person operating a computer uses to interact with the computer.

Having received a selection of an activity object, an activity picklist is caused to be outputted on a user interface page associated with a work step, block 122. The system displays activity picklists on work step pages. For example, and without limitation, this can include the work order generating system displaying a picklist on the check tire pressure work step page. An activity picklist can be a data construct that provides a description of somethings that may be selected to be used by a computer to achieve a goal.

After causing an activity picklist to be outputted on a user interface page associated with a work step, a selection is received of an activity in the activity picklist, block 124. The system receives selections of activities from activity picklists on work step pages. By way of example and without limitation, this can include the work order generating system receiving Joe's selection of a salesforce.com lightning flow for ordering new tires from the picklist.

Following the selection of an activity in an activity picklist that is output on a user interface page associated with a work step, an addition, a deletion, and/or a modification of at least one database record is performed by executing a user action or an automated business process corresponding to the activity in the activity picklist, block 126. The system enables a technician in the field to flexibly capture data by launching actions or flows while viewing specific work step pages. In embodiments, this can include the work order generating system creating a database record for the prospective order of new tires by launching a salesforce.com lightning flow for ordering new tires from the check tire pressure work step page. When creating a database record, the work order generating system captures data in the field in real time, which enables a system administrator in the back office to monitor and audit the activities of a technician in real time when the technician is working in the field. A database record can be a structured set of related items of information that are handled as a unit by a computer. A user action can be the process of a person operating a computer to achieve an aim. An automated business process can be a collection of connected tasks with little or no direct human control, which find their end in the delivery of a service or product to a customer.

Performing an addition, deletion, and/or modification of any database record can include updating a record of a status of a work step which corresponds to a user interface page on which the activity picklist is displayed. Executing a user action or an automated business process corresponding to an activity in an activity picklist can include linking an execution of the user action or the automated business process with a work step which corresponds to a user interface page on which the activity picklist is displayed. A record can be at least one stored value that could be used to update a database. A status can be the position of affairs at a particular time of an outline of a task to accomplish a goal. An execution can be a carrying out or a putting into effect of a plan or course of actions.

Since a field service technician may be using a mobile device that has a relatively small user interface, the technician's work is more efficient if the number of the technician's interactions (such as "clicks") with a work order are minimized. Therefore, the work order generating system generates a work order that organizes work plans into work steps, and can display each work step as a small task next to its check box which can be marked as "completed" with just a single click or screen swipe. Since the work order generating system can integrate the picklist that includes at least one action and at least one lighting flow into each work step's page, a technician can launch an action or a flow directly from a work step's page, without having to navigate to a dedicated page for the action or the flow. The use of a single-click activity object that triggers the display of a picklist simplifies the layout of a user interface for a technician. When the action or the flow is completed, the work order generating system automatically updates the status of the work step as completed, thereby saving the technician from multiple navigation steps and clicks. All functionalities of the work order generating system are accessible to technicians via application programming interface (API) calls. A mobile device application can easily call APIs to get the work done without being tightly coupled to the entire technology stack of the work order generating system.

For example, when Joe's repurposing of the "complete" button launches a lightning flow to order tires, the work order generating system automatically marks the check tire pressure work step as completed and links the prospective order of the new tires to the completed check tire pressure work step. Joe did not have enter several clicks to navigate from the launched lightning flow's page back to the check tire pressure work step page to mark the check tire pressure work step as completed. When viewing the launched lightning flow's first page, Joe enters the make, model, and year of Brian's Mercedes Benz. The launched lightning flow's second page displays the tire options available for Brian. which range from $80 to $800 per tire, but Brian does not select an option because his wife is responsible for the family budget.

In addition to executing an action or a flow, a selection is optionally received of another activity in an activity picklist on another user interface page associated with a work step, block 128. The system can receive selections of other activities in an activity picklist. For example, and without limitation, this can include the work order generating system receiving Joe's picks of other activities from the picklist, which repurpose the selection of the "complete" button to initially pause the launched lightning flow and then email a link to the paused lightning flow's page to Brian.

Having received a selection of another activity in an activity picklist, a user action or an automated business process, which corresponds to the other activity in the activity picklist, is optionally executed, block 130. The system can enable a technician in the field to flexibly capture data by launching other actions or flows while viewing specific work step pages. By way of example and without limitation, this can include the work order generating system pausing the launched lightning flow and then emailing a link to the paused lightning flow's page to Brian. Brian forwards Joe's email to his wife Hope, who selects one of the paused lightning flow page's options to purchase new tires, which resumes the lightning flow, and thereby orders the new tires.

After executing an action or a flow, a selection is optionally received of an activity object that is outputted on another user interface page of user interface pages associated with work steps, block 132. The system can receive a selection of the same activity object which is displayed on another work step's page. In embodiments, this can include the work order generating system receiving Andrew's selection of a "complete" button displayed on the checking the windshield water work step page for work step 7, which corresponds to checking the windshield water 616 in the work step table 322, as depicted in the frame 600 by FIG. 6. While confirming that the windshield water reservoir in Chris' car is sufficiently filled, Andrew notices that the tire tread was low on all four tires and recommends that Chris replace the tires soon, to which Chris agrees.

Following receipt of a selection of an activity object, an activity picklist is optionally caused to be outputted on another user interface page associated with a work step, block 134. The system can display the same activity picklist on other work steps' pages. For example, and without limitation, this can include the work order generating system displaying the same picklist, which was previously displayed on the check tire pressure work step page, on the check windshield water work step page. Andrew selects the same activity that Joe from the same picklist from which Joe selected, which repurposes the selection of the "complete" button on the check windshield water work step page to launch a salesforce.com lightning flow for ordering new tires from the check windshield water work step page, which creates a database record for the prospective order. Every user can access the same picklist of activities from any work step's page, instead of requiring a system administrator to configure a single activity to be dedicated to each object that may be selected by a specific group of users from a specific work step's page.

When Andrew's repurposing of the "complete" button launches a lightning flow to order tires, the work order generating system automatically marks the check windshield water work step as completed, and then links the prospective order of the new tires to the completed check windshield water work step. Andrew did not have enter several clicks to navigate from the launched lightning flow's page back to the check windshield water work step page to mark the check windshield water work step as completed. When viewing the launched lightning flow's first page, Andrew enters the make, model, and year of Chris' Kia. The launched lightning flow's second page displays the tire options available for Chris, which range from $50 to $200 per tire, and Chris selects one of the lightning flow page's options to purchase new tires, which completes the lightning flow thereby ordering the new tires.

The relationships between the instances of the work plans, work plan templates, work steps, and work step templates provide data mining capabilities to optimize the efficiency of work orders. When training on such captured data, the work order machine-learning model can apply data analysis to the captured data to suggest improved work orders based on technicians' feedback and dynamic modifications of work orders. For example, when a customer reported that their internet connection was very slow, the work order generating system previously created a work order that included the following internet connection slowness repair work plan and work steps. The work plan template included content for internet connection slowness repair, and the work step templates included content for record router model, check ethernet cable connection, update router firmware, conduct wired speed test, and conduct wireless speed test.

After 1,000 technicians completed these work steps, 500 technicians added a new work step to suggest that their customers purchase a new router to replace the customer's existing router if the customer's existing router was more than 5 years old. After training on this data, the work order machine-learning model updates the work step template with a new step for suggesting the customer purchase a new router to replace the customer's existing router. Furthermore, among the 500 cases when a technician suggested that a customer purchase a new router to replace the customer's existing router, 300 of the customers' existing routers were more than 8 years old, and the customers' acceptance rate was 90% to purchase a new router to replace the customers' existing routers that were more than 8 years old. However, for the remaining 200 customers' existing routers that were between 5 years old and 8 years old, the customers' acceptance rate was only 20% to purchase new routers to replace their existing routers. Therefore, the work order machine-learning model creates a new work plan template, and conditionally creates a new work plan that includes the new work step for suggesting that a customer purchase a new router to replace the customer's existing router if the customer's existing router is more than 8 years old. The work order generating system uses the work plans, the work plan templates, the work steps, and the work step templates and their relationships to gain insight into the efficiency of the technicians' work and fine tune how technicians can and should complete their work orders to improve customer satisfaction.

The frames 200, 400, 430, 500, 530, 560, 600, 700, 730, and/or 760 may be parts of larger display screens that include fields for users to enter commands to create, retrieve, edit, and store information. Because the frames 200, 400, 430, 500, 530, 560, 600, 700, 730, and/or 760 are samples, the frames 200, 400, 430, 500, 530, 560, 600, 700, 730, and/or 760 could vary greatly in appearance. For example, the relative sizes and positioning of the graphical images are not important to the practice of the present disclosure. The frames 200, 400, 430, 500, 530, 560, 600, 700, 730, and/or 760 may be depicted by any visual display, but they are preferably depicted by a computer screen. The frames 200, 400, 430, 500, 530, 560, 600, 700, 730, and/or 760 could also be output as reports and printed or saved in electronic formats, such as PDF.

The frames 200, 400, 430, 500, 530, 560, 600, 700, 730, and/or 760 may be parts of a personal computer system and/or a network, and operated from system data received by the network, and/or on the Internet. The frames 200, 400, 430, 500, 530, 560, 600, 700, 730, and/or 760 may be navigable by a user. Typically, a user can employ a touch screen input, voice command, or a mouse input device to point-and-click to locations on the frames 200, 400, 430, 500, 530, 560, 600, 700, 730, and/or 760 to manage the graphical images on the frames 200, 400, 430, 500, 530, 560, 600, 700, 730, and/or 760. Alternately, a user can employ directional indicators, or other input devices such as a keyboard. The graphical images depicted by the frames 200, 400, 430, 500, 530, 560, 600, 700, 730, and/or 760 are examples, as the frames 200, 400, 430, 500, 530, 560, 600, 700, 730, and/or 760 may include much greater amounts of graphical images. The frames 200, 400, 430, 500, 530, 560, 600, 700, 730, and/or 760 may also include fields in which a user can input information.

The method 100 may be repeated as desired. Although this disclosure describes the blocks 102-134 executing in a particular order, the blocks 102-134 may be executed in a different order. In other implementations, each of the blocks 102-134 may also be executed in combination with other blocks and/or some blocks may be divided into a different set of blocks.

System Overview

Figure 8:
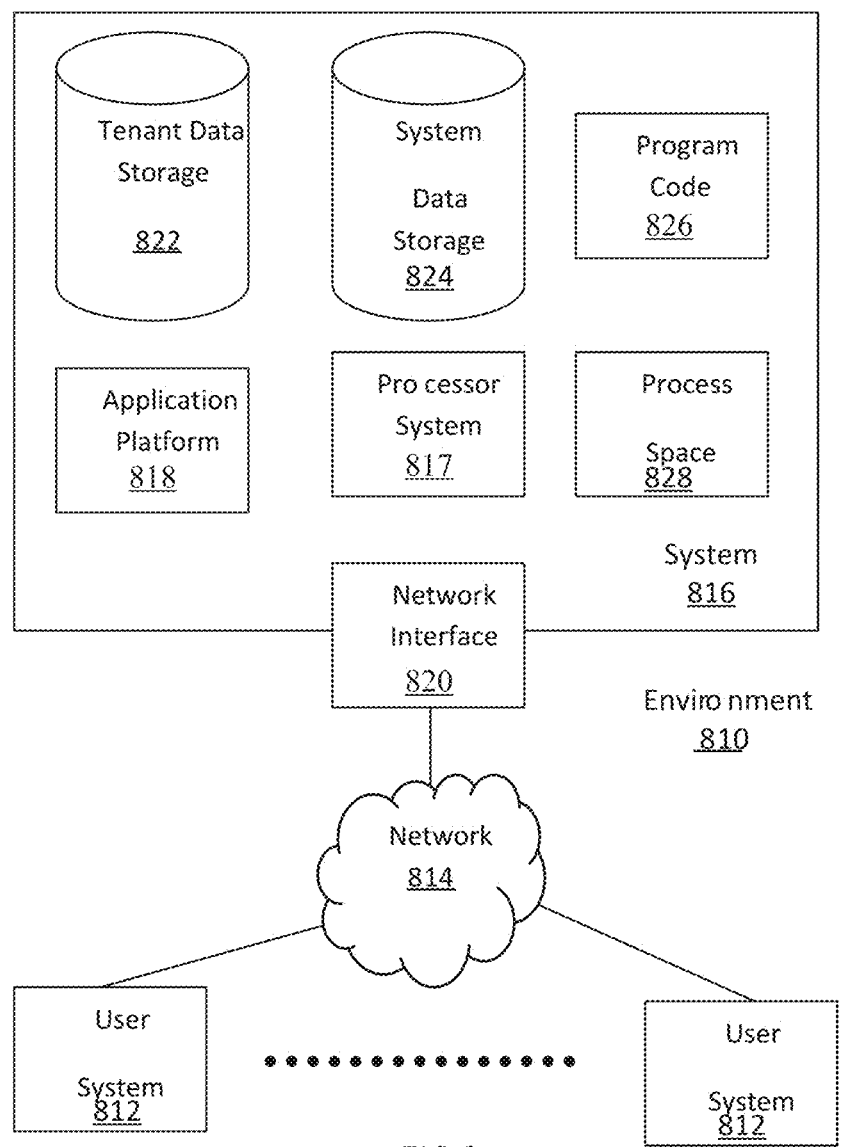
FIG. 8 illustrates a block diagram of an example of an environment 800 wherein an on-demand database service might be used.

FIG. 8 illustrates a block diagram of an environment 810 wherein an on-demand database service might be used. The environment 810 may include user systems 812, a network 814, a system 816, a processor system 817, an application platform 818, a network interface 820, a tenant data storage 822, a system data storage 824, program code 826, and a process space 828. In other embodiments, the environment 810 may not have all of the components listed and/or may have other elements instead of, or in addition to, those listed above.

The environment 810 is an environment in which an on-demand database service exists. A user system 812 may be any machine or system that is used by a user to access a database user system. For example, any of the user systems 812 may be a handheld computing device, a mobile phone, a laptop computer, a work-station, and/or a network of computing devices. As illustrated in FIG. 8 (and in more detail in FIG. 9) the user systems 812 might interact via the network 814 with an on-demand database service, which is the system 816.

An on-demand database service, such as the system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 816" and the "system 816" will be used interchangeably herein. A database image may include one or more database objects. A relational database management system (RDMS) or the equivalent may execute storage and retrieval of information against the database object(s). The application platform 818 may be a framework that allows the applications of the system 816 to run, such as the hardware and/or software, e.g., the operating system. In an embodiment, the on-demand database service 816 may include the application platform 818 which enables creation, managing and executing one or more applications developed by the provider of the on-demand database service, users accessing the on-demand database service via user systems 812, or third-party application developers accessing the on-demand database service via the user systems 812.

The users of the user systems 812 may differ in their respective capacities, and the capacity of a particular user system 812 might be entirely determined by permissions (permission levels) for the current user. For example, where a salesperson is using a particular user system 812 to interact with the system 816, that user system 812 has the capacities allotted to that salesperson. However, while an administrator is using that user system 812 to interact with the system 816, that user system 812 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 814 is any network or combination of networks of devices that communicate with one another. For example, the network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 812 might communicate with the system 816 using TCP/IP and, at a higher network level, use other common Internet protocols to communicate, such as HTTP, FTP, AFS, WAP, etc. In an example where HTTP is used, the user systems 812 might include an HTTP client commonly referred to as a "browser" for sending and receiving HTTP messages to and from an HTTP server at the system 816. Such an HTTP server might be implemented as the sole network interface between the system 816 and the network 814, but other techniques might be used as well or instead. In some implementations, the interface between the system 816 and the network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 816, shown in FIG. 8, implements a web-based customer relationship management (CRM) system. For example, in one embodiment, the system 816 includes application servers configured to implement and execute CRM software applications as well as provide related data, code, forms, webpages and other information to and from the user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 816 implements applications other than, or in addition to, a CRM application. For example, the system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of the system 816 is shown in FIG. 8, including the network interface 820, the application platform 818, the tenant data storage 822 for tenant data 823, the system data storage 824 for system data 825 accessible to the system 816 and possibly multiple tenants, the program code 826 for implementing various functions of the system 816, and the process space 828 for executing MTS system processes and tenant-specific processes, such as running applications as part of an application hosting service. Additional processes that may execute on the system 816 include database indexing processes.

Several elements in the system shown in FIG. 8 include conventional, well-known elements that are explained only briefly here. For example, each of the user systems 812 could include a desktop personal computer, workstation, laptop, PDA, cell phone, or any wireless access protocol (WAP) enabled device or any other computing device capable of interfacing directly or indirectly to the Internet or other network connection. Each of the user systems 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 812 to access, process and view information, pages and applications available to it from the system 816 over the network 814. Each of the user systems 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 816 or other systems or servers. For example, the user interface device may be used to access data and applications hosted by the system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 812 and all of its components are operator configurable using applications, such as a browser, including computer code run using a central processing unit such as an Intel Pentium® processor or the like. Similarly, the system 816 (and additional instances of an MTS, where more than one is present) and all of their components might be operator configurable using application(s) including computer code to run using a central processing unit such as the processor system 817, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 816 is configured to provide webpages, forms, applications, data and media content to the user (client) systems 812 to support the access by the user systems 812 as tenants of the system 816. As such, the system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
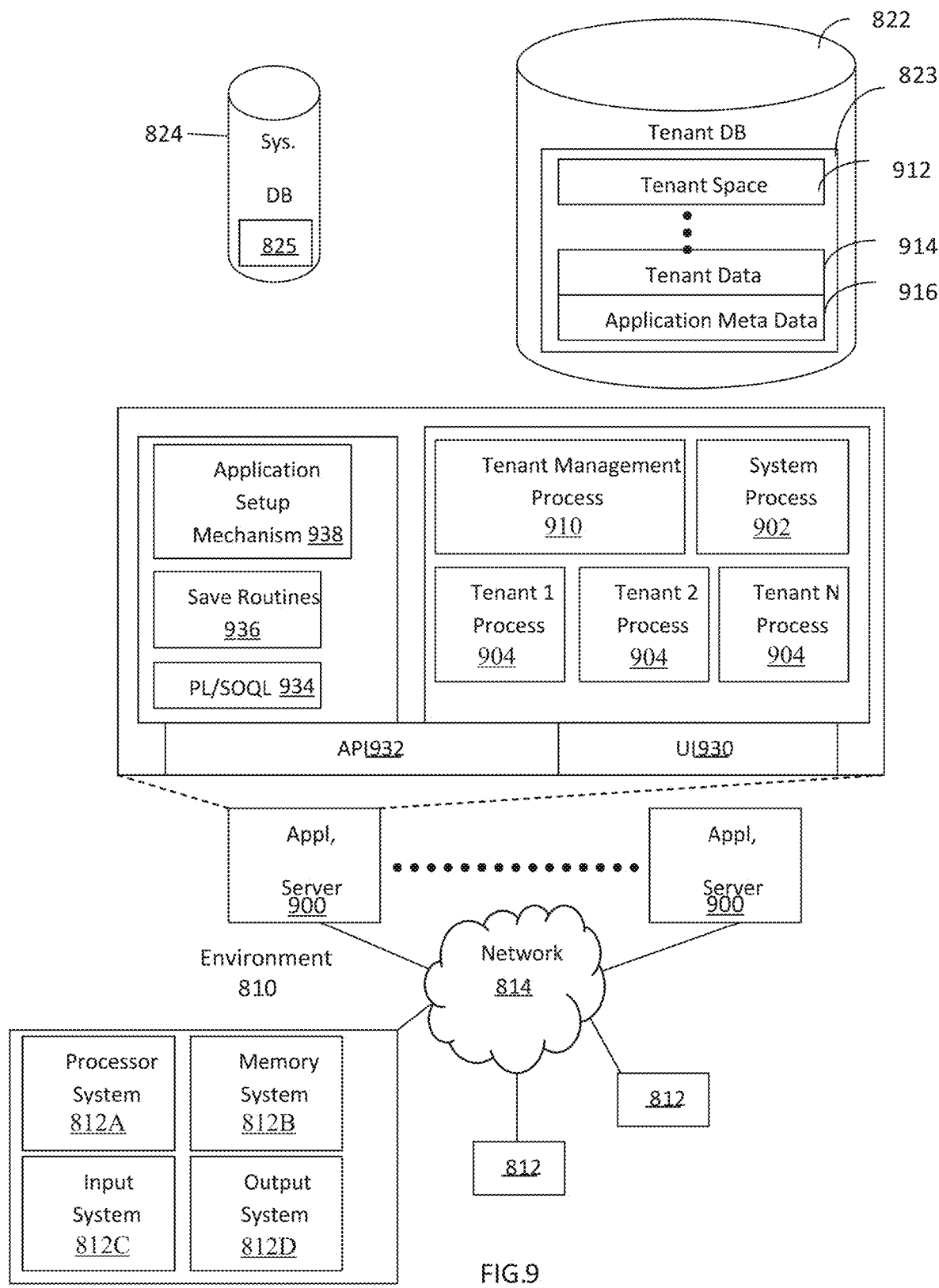
FIG. 9 illustrates a block diagram of an embodiment 900 of elements of FIG. 8 and various possible interconnections between these elements.

FIG. 9 also illustrates the environment 810. However, in FIG. 9 elements of the system 816 and various interconnections in an embodiment are further illustrated. FIG. 9 shows that the each of the user systems 812 may include a processor system 812A, a memory system 812B, an input system 812C, and an output system 812D. FIG. 9 shows the network 814 and the system 816. FIG. 9 also shows that the system 816 may include the tenant data storage 822, the tenant data 823, the system data storage 824, the system data 825, a User Interface (UI) 930, an Application Program Interface (API) 932, a PL/SOQL 934, save routines 936, an application setup mechanism 938, applications servers $900_1$-$900_N$, a system process space 902, tenant process spaces 904, a tenant management process space 910, a tenant storage area 912, a user storage 914, and application metadata 916. In other embodiments, the environment 810 may not have the same elements as those listed above and/or may have other elements instead of, or in addition to, those listed above.

The user systems 812, the network 814, the system 816, the tenant data storage 822, and the system data storage 824 were discussed above in FIG. 8. Regarding the user systems 812, the processor system 812A may be any combination of one or more processors. The memory system 812B may be any combination of one or more memory devices, short-term, and/or long-term memory. The input system 812C may be any combination of input devices, such as one or more keyboards, mice, trackballs, scanners, cameras, and/or interfaces to networks. The output system 812D may be any combination of output devices, such as one or more monitors, printers, and/or interfaces to networks. As shown by FIG. 9, the system 816 may include the network interface 820 (of FIG. 8) implemented as a set of HTTP application servers 900, the application platform 818, the tenant data storage 822, and the system data storage 824. Also shown is the system process space 902, including individual tenant process spaces 904 and the tenant management process space 910. Each application server 900 may be configured to access tenant data storage 822 and the tenant data 823 therein, and the system data storage 824 and the system data 825 therein to serve requests of the user systems 812. The tenant data 823 might be divided into individual tenant storage areas 912, which may be either a physical arrangement and/or a logical arrangement of data. Within each tenant storage area 912, the user storage 914 and the application metadata 916 might be similarly allocated for each user. For example, a copy of a user's most recently used (MRU) items might be stored to the user storage 914. Similarly, a copy of MRU items for an entire organization that is a tenant might be stored to the tenant storage area 912. The UI 930 provides a user interface and the API 932 provides an application programmer interface to the system 816 resident processes to users and/or developers at the user systems 812. The tenant data and the system data may be stored in various databases, such as one or more Oracle™ databases.

The application platform 818 includes the application setup mechanism 938 that supports application developers' creation and management of applications, which may be saved as metadata into the tenant data storage 822 by the save routines 936 for execution by subscribers as one or more tenant process spaces 904 managed by the tenant management process 910 for example. Invocations to such applications may be coded using the PL/SOQL 934 that provides a programming language style interface extension to the API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 916 for the subscriber making the invocation and executing the metadata as an application in a virtual machine.

Each application server 900 may be communicably coupled to database systems, e.g., having access to the system data 825 and the tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user could hit three different application servers 900, and three requests from different users could hit the same application server 900. In this manner, the system 816 is multi-tenant, wherein the system 816 handles storage of, and access to, different objects, data and applications across disparate users and organizations.

As an example of storage, one tenant might be a company that employs a sales force where each salesperson uses the system 816 to manage their sales process. Thus, a user might maintain contact data, leads data, customer follow-up data, performance data, goals and progress data, etc., all applicable to that user's personal sales process (e.g., in the tenant data storage 822). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 816 might also maintain system level data usable by multiple tenants or other data. Such system level data might include industry reports, news, postings, and the like that are sharable among tenants.

In certain embodiments, the user systems 812 (which may be client systems) communicate with the application servers 900 to request and update system-level and tenant-level data from the system 816 that may require sending one or more queries to the tenant data storage 822 and/or the system data storage 824. The system 816 (e.g., an application server 900 in the system 816) automatically generates one or more SQL statements (e.g., one or more SQL queries) that are designed to access the desired information. The system data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for associating executable actions/flows with work steps in work plans generated when creating new work orders, the system comprising:
    one or more processors; and
    a non-transitory computer readable medium storing a plurality of instructions, which when executed, cause the one or more processors to:
        identify, by a database system, work plan criteria based on an input for creating a work order, in response to receiving the input for creating the work order;
        select, by the database system using the identified work plan criteria, at least one work plan template, comprising a plurality of work steps, from a plurality of work plan templates;
        create, by the database system, a work order comprising at least one work plan corresponding to the selected at least one work plan template and comprising at least part of the input for creating the work order;
        cause, by the database system, the created work order, comprising the at least one work plan and the at least part of the input for creating the work order, to be outputted;
        cause, by the database system, an activity picklist to be outputted on a user interface page of a plurality of user interface pages associated with the plurality of work steps, in response to receiving a selection of an activity object that is outputted on the user interface page; and
        perform, by the database system, at least one of an addition, a deletion, and a modification of at least one database record by executing one of a user action and an automated business process corresponding to an activity in the activity picklist, in response to receiving a selection of the activity in the activity picklist.

2. The system of claim 1, comprising further instructions, which when executed, cause the one or more processors to:
    train, by the database system, a machine learning model to use inputs for creating work orders to select sets of work plan templates, comprising sets of work steps, from a training set of work plan templates, in response to receiving the inputs for creating the work orders;
    train, by the database system, the machine learning model to use the inputs for creating the work orders to perform additions, deletions, and modifications of a plurality of work steps in the sets of work steps in the sets of work plan templates; and
    perform, by the machine learning model using the identified work plan criteria, at least one of an addition, a deletion, and a modification of at least one of the plurality of work steps in the selected at least one work plan template.

3. The system of claim 1, wherein at least one of the user action and the automated business process is at least one of configured by a software vendor, configured by an end user, and dynamically configured by another end user.

4. The system of claim 1, wherein performing the at least one of the addition, the deletion, and the modification of the at least one database record comprises updating a record of a status of a work step, of the plurality of work steps, which corresponds to the user interface page on which the activity picklist is outputted.

5. The system of claim 1, wherein executing the one of the user action and the automated business process corresponding to the activity in the activity picklist comprises linking an execution of the one of the user action and the automated business process with a work step, of the plurality of work steps, which corresponds to the user interface page on which the activity picklist is outputted.

6. The system of claim 1, comprising further instructions, which when executed, cause the one or more processors to execute, by the database system, one of any user action and any automated business process corresponding to another activity in the activity picklist, in response to receiving a selection of the other activity in the activity picklist.

7. The system of claim 1, comprising further instructions, which when executed, cause the one or more processors to cause, by the database system, the activity picklist to be outputted on another user interface page of the plurality of user interface pages associated with the plurality of work steps, in response to receiving a selection of an activity object that is outputted on the other user interface page.

8. A computer program product comprising computer-readable program code to be executed by one or more processors when retrieved from a non-transitory computer-readable medium, the program code including instructions to:
identify, by a database system, work plan criteria based on an input for creating a work order, in response to receiving the input for creating the work order;
select, by the database system using the identified work plan criteria, at least one work plan template, comprising a plurality of work steps, from a plurality of work plan templates;
create, by the database system, a work order comprising at least one work plan corresponding to the selected at least one work plan template and comprising at least part of the input for creating the work order;
cause, by the database system, the created work order, comprising the at least one work plan and the at least part of the input for creating the work order, to be outputted;
cause, by the database system, an activity picklist to be outputted on a user interface page of a plurality of user interface pages associated with the plurality of work steps, in response to receiving a selection of an activity object that is outputted on the user interface page; and
perform, by the database system, at least one of an addition, a deletion, and a modification of at least one database record by executing one of a user action and an automated business process corresponding to an activity in the activity picklist, in response to receiving a selection of the activity in the activity picklist.

9. The computer program product of claim 8, wherein the program code comprises further instructions to:
train, by the database system, a machine learning model to use inputs for creating work orders to select sets of work plan templates, comprising sets of work steps, from a training set of work plan templates, in response to receiving the inputs for creating the work orders;
train, by the database system, the machine learning model to use the inputs for creating the work orders to perform additions, deletions, and modifications of a plurality of work steps in the sets of work steps in the sets of work plan templates; and
perform, by the machine learning model using the identified work plan criteria, at least one of an addition, a deletion, and a modification of at least one of the plurality of work steps in the selected at least one work plan template.

10. The computer program product of claim 8, wherein at least one of the user action and the automated business process is at least one of configured by a software vendor, configured by an end user, and dynamically configured by another end user.

11. The computer program product of claim 8, wherein performing the at least one of the addition, the deletion, and the modification of the at least one database record comprises updating a record of a status of a work step, of the plurality of work steps, which corresponds to the user interface page on which the activity picklist is outputted.

12. The computer program product of claim 8, wherein executing the one of the user action and the automated business process corresponding to the activity in the activity picklist comprises linking an execution of the one of the user action and the automated business process with a work step, of the plurality of work steps, which corresponds to the user interface page on which the activity picklist is outputted.

13. The computer program product of claim 8, wherein the program code comprises further instructions to execute, by the database system, one of any user action and any automated business process corresponding to another activity in the activity picklist, in response to receiving a selection of the other activity in the activity picklist.

14. The computer program product of claim 8, wherein the program code comprises further instructions to cause, by the database system, the activity picklist to be outputted on another user interface page of the plurality of user interface pages associated with the plurality of work steps, in response to receiving a selection of an activity object that is outputted on the other user interface page.

15. A computer-implemented method for associating executable actions/flows with work steps in work plans generated when creating new work orders, the computer-implemented method comprising:
identifying, by a database system, work plan criteria based on an input for creating a work order, in response to receiving the input for creating the work order;
selecting, by the database system using the identified work plan criteria, at least one work plan template, comprising a plurality of work steps, from a plurality of work plan templates;
creating, by the database system, a work order comprising at least one work plan corresponding to the selected at least one work plan template and comprising at least part of the input for creating the work order; and
causing, by the database system, the created work order, comprising the at least one work plan and the at least part of the input for creating the work order, to be outputted;
causing, by the database system, an activity picklist to be outputted on a user interface page of a plurality of user interface pages associated with the plurality of work steps, in response to receiving a selection of an activity object that is outputted on the user interface page; and
performing, by the database system, at least one of an addition, a deletion, and a modification of at least one database record by executing one of a user action and an automated business process corresponding to an activity in the activity picklist, in response to receiving a selection of the activity in the activity picklist.

16. The computer-implemented method of claim 15, the computer-implemented method further comprising;

training, by the database system, a machine learning model to use inputs for creating work orders to select sets of work plan templates, comprising sets of work steps, from a training set of work plan templates, in response to receiving the inputs for creating the work orders;

training, by the database system, the machine learning model to use the inputs for creating the work orders to perform additions, deletions, and modifications of a plurality of work steps in the sets of work steps in the sets of work plan templates; and performing, by the machine learning model using the identified work plan criteria, at least one of an addition, a deletion, and a modification of at least one of the plurality of work steps in the selected at least one work plan template.

17. The computer-implemented method of claim 15, wherein at least one of the user action and the automated business process is at least one of configured by a software vendor, configured by an end user, and dynamically configured by another end user.

18. The computer-implemented method of claim 15, wherein performing the at least one of the addition, the deletion, and the modification of the at least one database record comprises updating a record of a status of a work step, of the plurality of work steps, which corresponds to the user interface page on which the activity picklist is outputted; and executing the one of the user action and the automated business process corresponding to the activity in the activity picklist comprises linking an execution of the one of the user action and the automated business process with a work step, of the plurality of work steps, which corresponds to the user interface page on which the activity picklist is outputted.

19. The computer-implemented method of claim 15, the computer-implemented method further comprising executing, by the database system, one of any user action and any automated business process corresponding to another activity in the activity picklist, in response to receiving a selection of the other activity in the activity picklist.

20. The computer-implemented method of claim 15, the computer-implemented method further comprising causing, by the database system, the activity picklist to be outputted on another user interface page of the plurality of user interface pages associated with the plurality of work steps, in response to receiving a selection of an activity object that is outputted on the other user interface page.

* * * * *